US012592511B2

(12) United States Patent
Choi et al.

(10) Patent No.: US 12,592,511 B2
(45) Date of Patent: Mar. 31, 2026

(54) METAL SHELL-LESS RECEPTACLE CONNECTOR

(71) Applicant: PhilTech Co., Ltd., Seongnam-si (KR)

(72) Inventors: Jae-Hyuk Choi, Hanam-si (KR); Chung-Seok Lee, Seongnam-si (KR)

(73) Assignee: EDS Solution Co., Ltd., Anyang-si (KR)

( * ) Notice: Subject to any disclaimer, the term of this patent is extended or adjusted under 35 U.S.C. 154(b) by 466 days.

(21) Appl. No.: 18/075,674

(22) Filed: Dec. 6, 2022

(65) Prior Publication Data

US 2023/0238733 A1 Jul. 27, 2023

(30) Foreign Application Priority Data

Jan. 25, 2022 (KR) ........................ 10-2022-0010968

(51) Int. Cl.
*H01R 13/52* (2006.01)
*H01R 13/512* (2006.01)

(52) U.S. Cl.
CPC ....... *H01R 13/5202* (2013.01); *H01R 13/512* (2013.01); *H01R 13/5216* (2013.01)

(58) Field of Classification Search
None
See application file for complete search history.

(56) References Cited

U.S. PATENT DOCUMENTS 5,017,740 A * 5/1991 Honkomp ............ H01B 17/305
337/273
10,468,801 B2 * 11/2019 Okuno ................... H01R 13/03
11,990,710 B2 * 5/2024 Chang .................... H01R 43/20

FOREIGN PATENT DOCUMENTS

KR 101745574 B1 6/2017
KR 101750882 B1 6/2017
KR 101768215 B1 8/2017
KR 101768216 B1 8/2017
KR 102246563 B1 * 5/2021

* cited by examiner

*Primary Examiner* — Felix O Figueroa
(74) *Attorney, Agent, or Firm* — NKL Law; Jae Youn Kim

(57) ABSTRACT

A metal shell-less receptacle connector includes a ceramic module, a glass seal having an insertion hole into which an outer circumferential portion of the ceramic module is fitted, and a ceramic support having a seal fastening hole into which an outer circumferential portion of the glass seal is fitted and fastening holes to which fasteners are fastened. Contacts and a ceramic material are integrated, whereby high data transmission is enabled due to impedance optimization and low loss characteristics, heat dissipation performance is improved due to high thermal conductivity, and durability is improved due to high strength. Shell-less structure reduces frequency interference, thereby improving the performance of an antenna positioned adjacent to the connector. Glass seal improves waterproof performance. Connector connects to a main board using a flexible printed circuit board, thereby improving the degree of freedom of position.

4 Claims, 16 Drawing Sheets

Structure without a connector

Shell-less structure

METAL SHELL-LESS RECEPTACLE CONNECTOR

CROSS REFERENCE TO RELATED APPLICATION

The present application claims priority to Korean Patent Application No. 10-2022-0010968, filed Jan. 25, 2022, the entire contents of which are incorporated herein for all purposes by this reference.

BACKGROUND OF THE INVENTION

Field of the Invention

Embodiments of The present disclosure relate to a metal shell-less receptacle connector. More particularly, the metal shell-less receptacle connector has a structure in which contacts and a ceramic material are integrated, whereby high data transmission may be enabled due to impedance optimization and low loss characteristics, heat dissipation performance may be improved due to high thermal conductivity, and durability may be improved due to high strength. The shell-less structure may reduce frequency interference, thereby improving the performance of an antenna positioned adjacent to the connector. A glass seal may improve waterproof performance. The shell-less receptacle connector may be connected to a main board using a flexible printed circuit board (FPCB), thereby improving the degree of freedom of position. A simple assembly structure may promote mass production, thereby reducing cost.

Description of the Related Art

As is well known in the art, a connector is a component widely used in electronic devices such as a mobile terminal. Recently, as electronic devices have been miniaturized, the connector has become gradually smaller and thinner. In addition, with increases in the density of electronic devices mounted on a circuit board, the number of contacts provided on a connector device has increased and the array pitch between the contacts has been reduced.

Typically, the connector includes a receptacle connector in which a plurality of receptacle contacts are disposed on a receptacle insulator and a plug connector in which a plurality of plug contacts in one-to-one contact with receptacle contacts are disposed on a plug insulator.

The receptacle contacts and the plug contacts are connected to a receptacle-side cable or a plug-side cable or mounted on a circuit board. When the receptacle contacts and the plug contacts are brought into contact with each other by inserting each plug into a corresponding receptacle, the receptacle-side cable and the plug-side cable or circuits of circuit boards are electrically connected. In this manner, the corresponding device may communicate with an external device or be supplied with power.

However, the above-described technology of the related art has the following problems.

That is, the plastic connector of the related art may have problems such as attenuation, delay, or the like in a high-frequency signal due to high dielectric loss of an insulating material. Due to limitations of the punching process, the line width of metal contacts has a low degree of freedom, thereby making it difficult to optimize impedance.

In addition, in the related-art connector, heat is generated from a contact portion between the plug and the receptacle contact. Since the resistance of a metal increases with increasing temperature, charging efficiency is reduced.

Furthermore, the related-art connector is brought into contacts through insertion and withdrawal. In this process, the insulator may be worn, thereby reducing lifetime.

In addition, when mounted on a printed circuit board (PCB), the plastic connector of the related art is susceptible to deformation since contact pins are exposed. This has been pointed out as a problem increasing the defect rate of surface mounter technology (SMT).

In particular, since the connector of the related art does not have a metal shell-less structure, there is no improvement in the performance of an antenna. This has been pointed as a significant problem.

In order to overcome the above-described problems, attempts have been developed as disclosed below in the Documents of Related Art section. However, there still is a severe problem in that all of the above-described problems of the related art have not been overcome.

The foregoing is intended merely to aid in the understanding of the background of the present disclosure, and is not intended to mean that the present disclosure falls within the purview of the related art that is already known to those skilled in the art.

Documents of Related Art (Patent Document 1) Korean Patent No. 10-2246563 (published on Apr. 26, 2021)
(Patent Document 2) Korean Patent No. 10-1768216 (published on Aug. 8, 2017)
(Patent Document 3) Korean Patent No. 10-1745574 (published on Jun. 2, 2017)
(Patent Document 4) Korean Patent No. 10-1768215 (published on Aug. 8, 2017)
(Patent Document 5) Korean Patent No. 10-1750882 (published on Jun. 20, 2017)

SUMMARY OF THE INVENTION

Accordingly, the present disclosure has been made keeping in mind the above problems occurring in the related art, and a first objective of the present disclosure is intended to propose a metal shell-less receptacle connector provided with a ceramic module, ceramic supports, a glass seal, an O-ring, and lower and upper ceramic supports. A second objective of the present disclosure according to the above-described technical configuration is to provide a metal shell-less receptacle connector that may be formed using ceramic having lower dielectric loss and higher heat resistance performance than a related-art connector formed using plastic, and thus may be mass produced at low cost due to a simplified process. A third objective of the present disclosure is to provide a metal shell-less receptacle connector enabling high-speed data transmission due to low loss characteristics of the ceramic material. The metal contacts are formed on the ceramic insulator by direct copper plating or direct copper bonding. Due to high degree of freedom of a line width, impedance may be optimized, thereby enabling high-speed data transmission. A fourth objective of the present disclosure is to provide a metal shell-less receptacle connector in which heat dissipation is effective when the insulators has high thermal conductivity, since heat is transmitted to the contacts, the insulators, and outer shells. Thermal conductivity performance of ceramic is 80 times than that of a plastic material of the related art. Accordingly, heat dissipation performance was improved. A fifth objective of the present disclosure is to provide a metal shell-less receptacle connector in which durability may be improved due to high strength and friction resistance characteristics of the ceramic material. A sixth objective of the present disclosure is to provide a metal shell-less receptacle connector having a structure in which metal contacts are precisely provided on a ceramic material, thereby reducing surface mounter technology (SMT) defects due to high position precision. A seventh objective of the present disclosure is to provide a metal shell-less receptacle connector in which the shell-less structure may reduce frequency interference to have no change in resonance frequency of an antenna positioned adjacent to the connector and have only a small amount of reduction in gain, thereby reducing the performance of the antenna. An eighth objective of the present disclosure is to provide a metal shell-less receptacle connector in which the glass seal may improve waterproof performance by providing a seal to the ceramic module and the ceramic support using glass. Due to simplified assembly, mass production ability may be improved. A ninth objective of the present disclosure is to provide a metal shell-less receptacle connector that may be connected to a main board using a flexible printed circuit board (FPCB), thereby simplifying an assembly process and improving the degree of freedom of design of the main board. A tenth objective of the present disclosure is to provide a metal shell-less receptacle connector configured such that the quality and reliability of the receptacle connector may be significantly improved.

In order to achieve at least one of the above objectives, there is provided a metal shell-less receptacle connector including: a ceramic module; a glass seal having an insertion hole into which an outer circumferential portion of the ceramic module is fitted; and a ceramic support having a seal fastening hole into which an outer circumferential portion of the glass seal is fitted and fastening holes to which fasteners are fastened.

Also provided is a metal shell-less receptacle connector including: a ceramic module; an upper ceramic support fitted to one side of the outer circumferential portion of the ceramic module; a lower ceramic support fitted to the other side of the outer circumferential portion of the ceramic module; and a glass bonding material fitted between the upper and lower ceramic supports to tightly attach the ceramic module and the upper and lower ceramic supports to each other.

According to the present disclosure, the receptacle connector is provided with the ceramic module, the ceramic supports, the glass seal, the O-ring, and the lower and upper ceramic supports.

According to the present disclosure having the above-described technical configuration, the connector may be formed using ceramic having lower dielectric loss and higher heat resistance performance than a related-art connector formed using plastic, and thus may be mass produced at low cost due to a simplified process.

In addition, according to the present disclosure, high-speed data transmission is possible due to low loss characteristics of the ceramic material. The metal contacts are formed on the ceramic insulator by direct copper plating or direct copper bonding. Due to high degree of freedom of a line width, impedance may be optimized, thereby enabling high-speed data transmission.

Furthermore, according to the present disclosure, heat dissipation is effective when the insulators have high thermal conductivity, since heat is transmitted to the contacts, the insulators, and outer shells. Thermal conductivity performance of ceramic is 80 times than that of a plastic material of the related art. Accordingly, heat dissipation performance was improved.

In addition, according to the present disclosure, due to high strength and friction resistance characteristics of the ceramic material, durability may be improved.

Furthermore, according to the present disclosure, the structure in which the metal contacts are precisely provided on the ceramic material may reduce surface mounter technology (SMT) defects due to high position precision.

In particular, according to the present disclosure, the shell-less structure may reduce frequency interference to have no change in resonance frequency of an antenna positioned adjacent to the connector and have only a small amount of reduction in gain, thereby reducing the performance of the antenna.

In addition, according to the present disclosure, the glass seal may improve waterproof performance by providing a seal to the ceramic module and the ceramic support using glass. Due to simplified assembly, mass production ability may be improved.

Furthermore, according to the present disclosure, the connector may be connected to a main board using an FPCB, thereby simplifying an assembly process and improving the degree of freedom of design of the main board.

According to the present disclosure, the above-described effects may significantly improve the quality and reliability of the receptacle connector.

Hereinafter, exemplary embodiments of the present disclosure for realizing the above-described effects will be described with reference to the accompanying drawings as follows.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Figure 1:
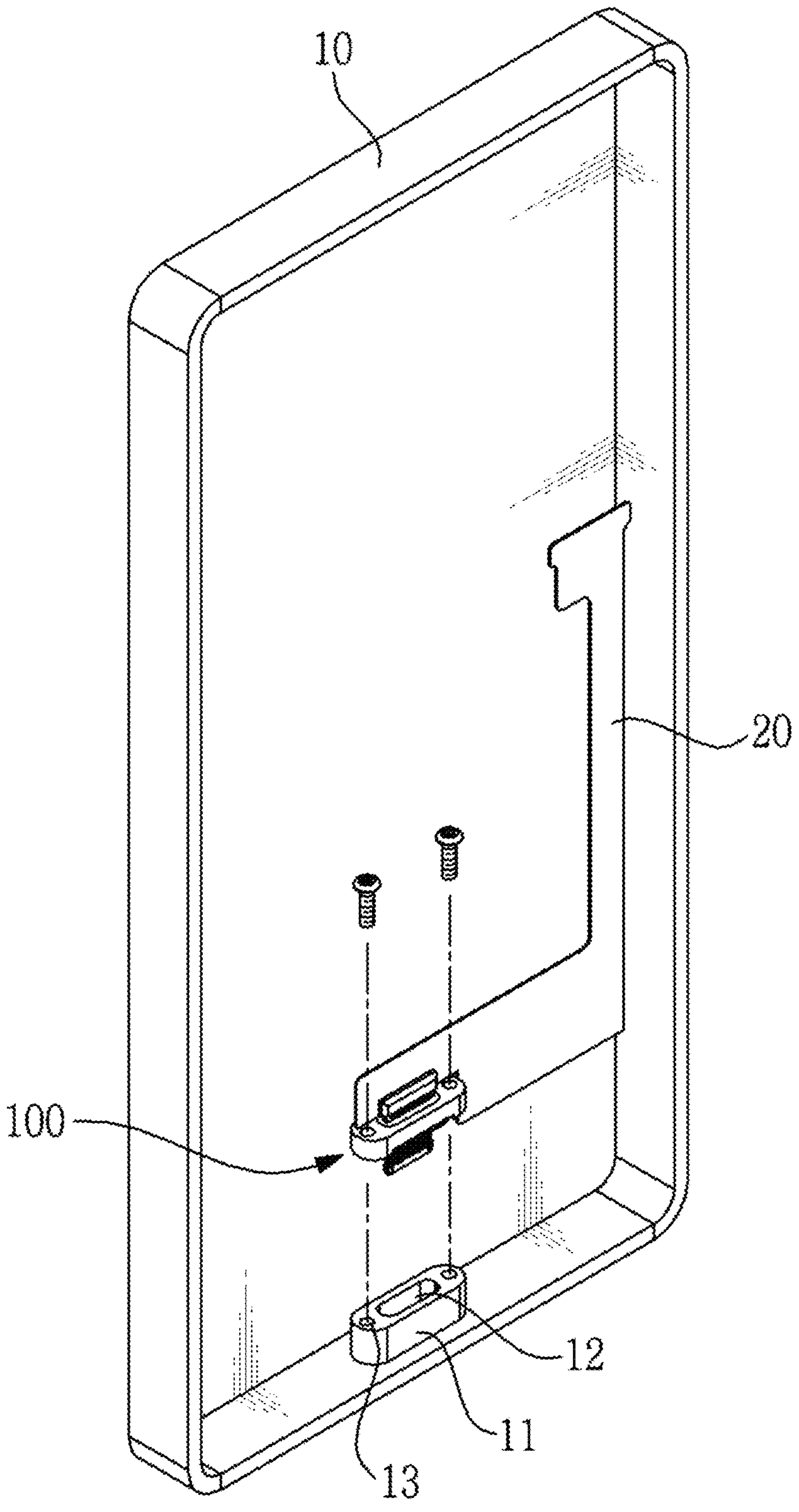
FIG. 1 is an exploded perspective view illustrating the utilization of a metal shell-less receptacle connector according to a first embodiment of the present disclosure.

A metal shell-less receptacle connector according to the present disclosure is configured as illustrated in FIGS. 1 to 13.

In the description of the present disclosure, a detailed description of known functions and configurations incorporated herein will be omitted when it is determined that the description may make the subject matter in some embodiments of the present invention rather unclear.

In addition, the following terms will be defined, considering functions thereof in the present disclosure, and may be varied according to intentions and customs of a user or an operator. Therefore, the terms should be defined on the basis of the contents of the entire specification.

In the drawings, the sizes and thicknesses of components may be changed arbitrarily for the sake of brevity, and thus the present disclosure is not limited to those illustrated in the drawings.

The present disclosure includes a first embodiment and a second embodiment.

First, the first embodiment of the present disclosure is configured as follows:

First Embodiment

The present disclosure pertains to a receptacle connector 100 including a ceramic module 110.

The receptacle connector 100 according to the present disclosure includes a glass seal 130 fixing and sealing the ceramic module 110 and a ceramic support 120. The glass seal 130 has an insertion hole 131 into which the outer circumferential portion of the ceramic module 110 may be fitted.

In addition, the ceramic support 120 has a seal fastening hole 121 into which the outer circumferential portion of the glass seal 130 may be fitted and fastening holes 122 to which fasteners 150 may be fastened.

Here, the ceramic support 120 may have an O-ring seating portion 123, to which an O-ring 140 may be fitted to provide airtightness.

In particular, the receptacle connector 100 is connected to a main board by being mounted on a flexible printed circuit board (FPCB) 20 and then fixed using an underfill. The FPCB 20 has a cut portion 21 for mounting of the receptacle connector 100 on the main board.

The receptacle connector 100 is connected to a connector connecting part 11 of a frame 10. The connector connecting part 11 has a through-hole 12 in the central portion and fastening holes 13 on both sides of the through-hole 12. The through-hole 12 allows the ceramic module 110 to be inserted thereinto, and the fasteners 150 are fastened to the fastening holes 13. In addition, the receptacle connector 100 is fitted to the connector connecting part 11 of the frame 10, and the fasteners 150 fastened to the fastening holes 13.

Second Embodiment

That is, the present disclosure pertains to a receptacle connector 200 including a ceramic module 210.

In addition, the receptacle connector 200 according to the present disclosure includes an upper ceramic support 240 fitted to one side of the outer circumferential portion of the ceramic module 210.

Furthermore, the receptacle connector 200 according to the present disclosure includes a lower ceramic support 220 fitted to the other side of the outer circumferential portion of the ceramic module 210. The lower ceramic support 220 has fastening holes 221 to which fasteners 250 are fastened.

In addition, the receptacle connector 200 according to the present disclosure includes a glass bonding material 230 fitted between the upper and lower ceramic supports 240 and 220 to tightly attach the ceramic module 210 and the upper and lower ceramic supports 240 and 220 to each other.

In particular, the receptacle connector 200 is connected to a main board by being mounted on an FPCB **20*a* and then fixed using an underfill. The FPCB 20*a* has a cut portion 21*a* for mounting the receptacle connector 200 on the main board and holes 21*b* to which the fasteners 250** are fastened.

Furthermore, the receptacle connector 200 is fitted to a connector connecting part 15 of a frame **10*a*. The connector connecting part 15 has a seating portion 17 on which the receptacle connector 200 is seated. The connector connecting part 15 has a through-hole 16 in the central portion and fastening holes 18 on both sides of the through-hole 16. The through-hole 16 allows the ceramic module 210 to be inserted thereinto, and the fasteners 250 are fastened to the fastening holes 13**.

In addition, the ceramic module 110 or 210 according to the present disclosure is configured as follows.

That is, the ceramic module 110/210 according to the present disclosure includes an intermediate metal layer 111/211.

In addition, the ceramic module 110/210 according to the present disclosure includes an upper ceramic insulator 112/212 and a lower ceramic insulator 113/213 provided on the outer circumferential portions of the intermediate metal layer 111/211.

In the present disclosure, an upper metal contact 114/214 and a lower metal contact 115/215 are provided on the top surface of the upper ceramic insulator 112/212 and the bottom surface of the lower ceramic insulator 113/213, respectively.

In the present disclosure, an upper ceramic plate 116/216 and a lower ceramic plate 117/217 are provided on the top surface of the upper metal contact 114/214 and the bottom surface of the lower metal contact 115/215, respectively.

In addition, the ceramic module 110/210 according to the present disclosure is configured as follows.

That is, in the present disclosure, the upper and lower metal contacts 114/214 and 115/215 are formed on the outer circumferential portions of the upper and lower ceramic insulators 112/212 and 113/213 by one selected from printing, deposition, filling, peeling, direct copper plating, and direct copper bonding.

Here, the upper and lower metal contacts 114/214 or 115/215 are formed on the outer circumferential portions of the upper and lower ceramic insulators 112/212 and 113/213 by firing at a temperature of 900° C. to 950° C.

At a temperature lower than 900° C., the firing may not be appropriate. At a temperature higher than 950° C., ceramic may be deformed. Thus, the firing temperature may range from 900° C. to 950° C.

Finally, according to the present disclosure, each of the upper ceramic plate 116/216, the lower ceramic plate 117/217, and the intermediate metal layer 111/211 is formed of one selected from high temperature co-fired ceramic (HTCC), low temperature co-fired ceramic (LTCC), low temperature co-fired ceramic on metal (LTCC-M), and a glass bonding material.

According to the present disclosure, the receptacle connector 100/200 is connected to the main board by connecting the receptacle connector 100/200 to the outer circumferential portion of the FPCB 20/20*a* by soldering and fixing the receptacle connector 100/200 using the underfill 110*a*/210*a*.

In addition, the above-described components of the present disclosure may be variously changed and have a variety of shapes.

Furthermore, the present disclosure should not be understood as being limited to the specific shapes stated in the detailed description. Rather, the present disclosure should be understood as including all of modifications, equivalents, and substitutes within the spirit and scope of the present disclosure defined by the appended claims.

The operation and effects of the metal shell-less receptacle connector configured as above according to the present disclosure will be described as follows.

First, according to the present disclosure, the contacts and the ceramic material are integrated, whereby high data transmission may be enabled due to impedance optimization and low loss characteristics, heat dissipation performance may be improved due to high thermal conductivity, and durability may be improved due to high strength. The shell-less structure may reduce frequency interference, thereby improving the performance of an antenna positioned adjacent to the connector. The glass seal may improve waterproof performance. The shell-less receptacle connector may be connected to a main board using the FPCB, thereby improving the degree of freedom of position. A simple assembly structure may promote mass production, thereby reducing cost.

Figure 2:
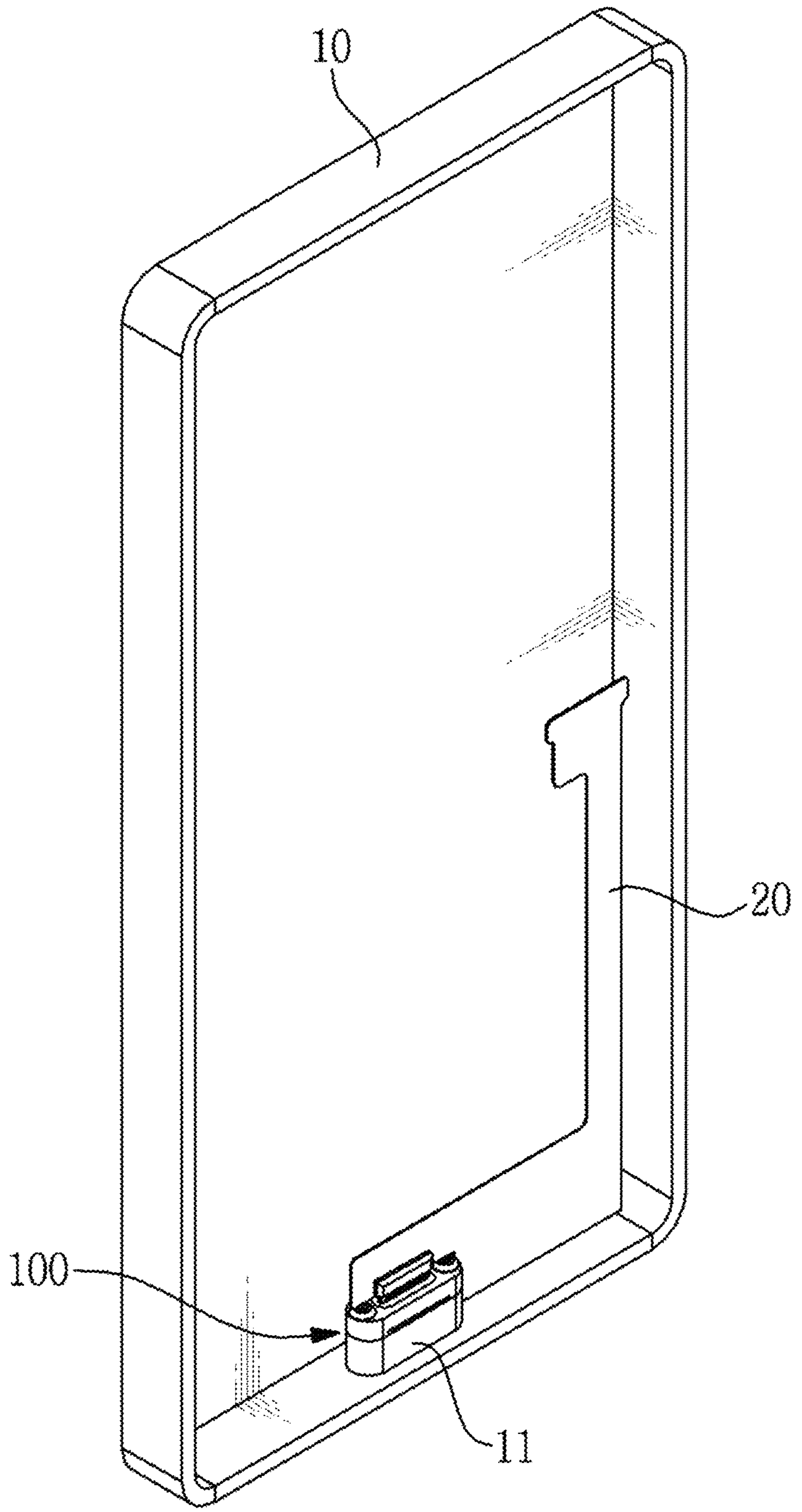
FIG. 2 is an assembled perspective view illustrating the utilization of the metal shell-less receptacle connector according to the first embodiment of the present disclosure.

In this regard, according to the present disclosure, FIG. 1 is an exploded perspective view illustrating the utilization of the metal shell-less receptacle connector 100 according to the first embodiment of the present disclosure, and FIG. 2 is an assembled perspective view illustrating the utilization of the metal shell-less receptacle connector 100 according to the first embodiment of the present disclosure. The receptacle connector 100 is mounted on the connector connecting part 11 of the frame 10 using the FPCB 20.

Figure 3:
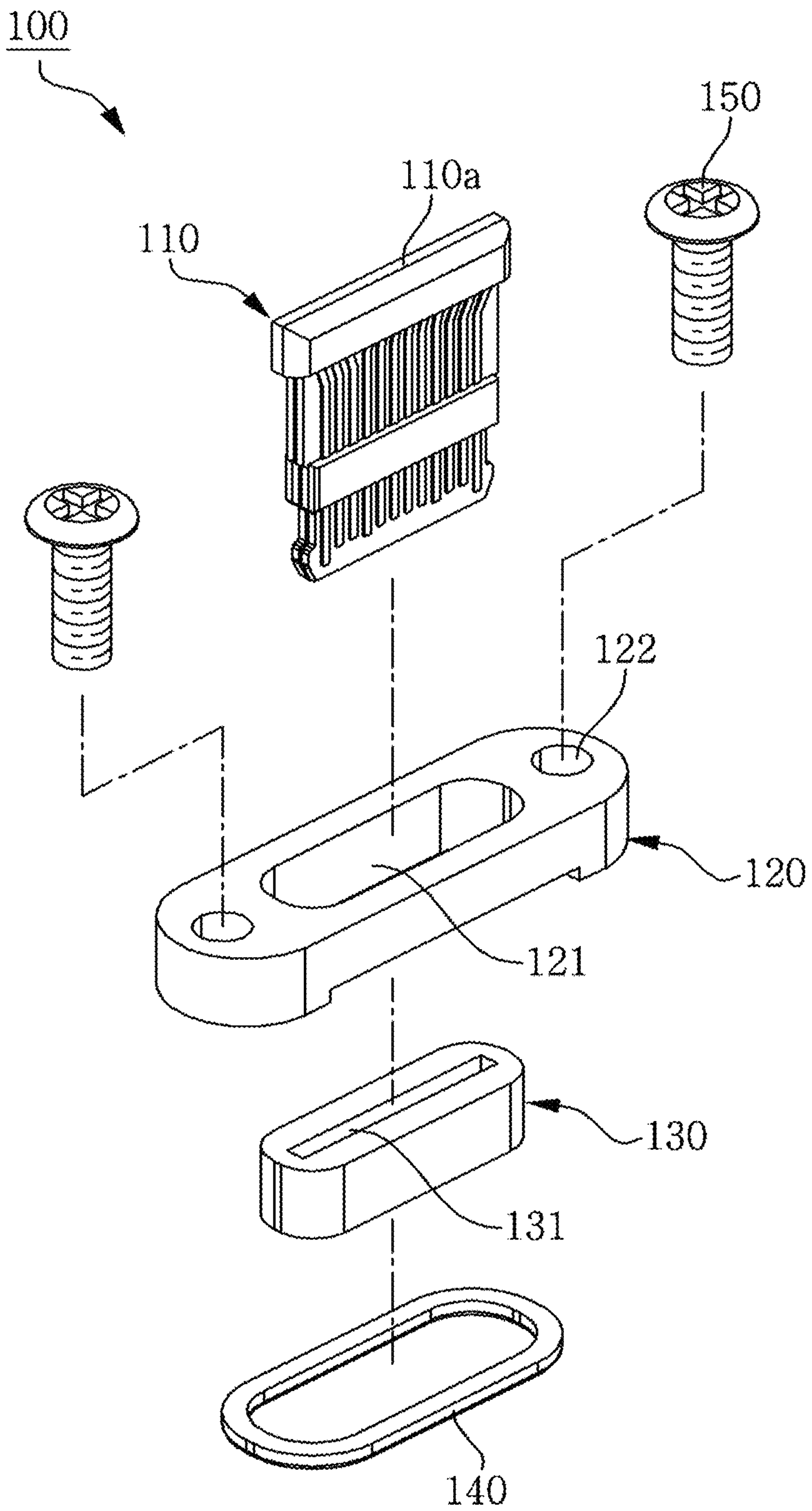
FIG. 3 is an exploded perspective view illustrating the metal shell-less receptacle connector according to the present disclosure, exploded in a vertical direction.
Figure 4:
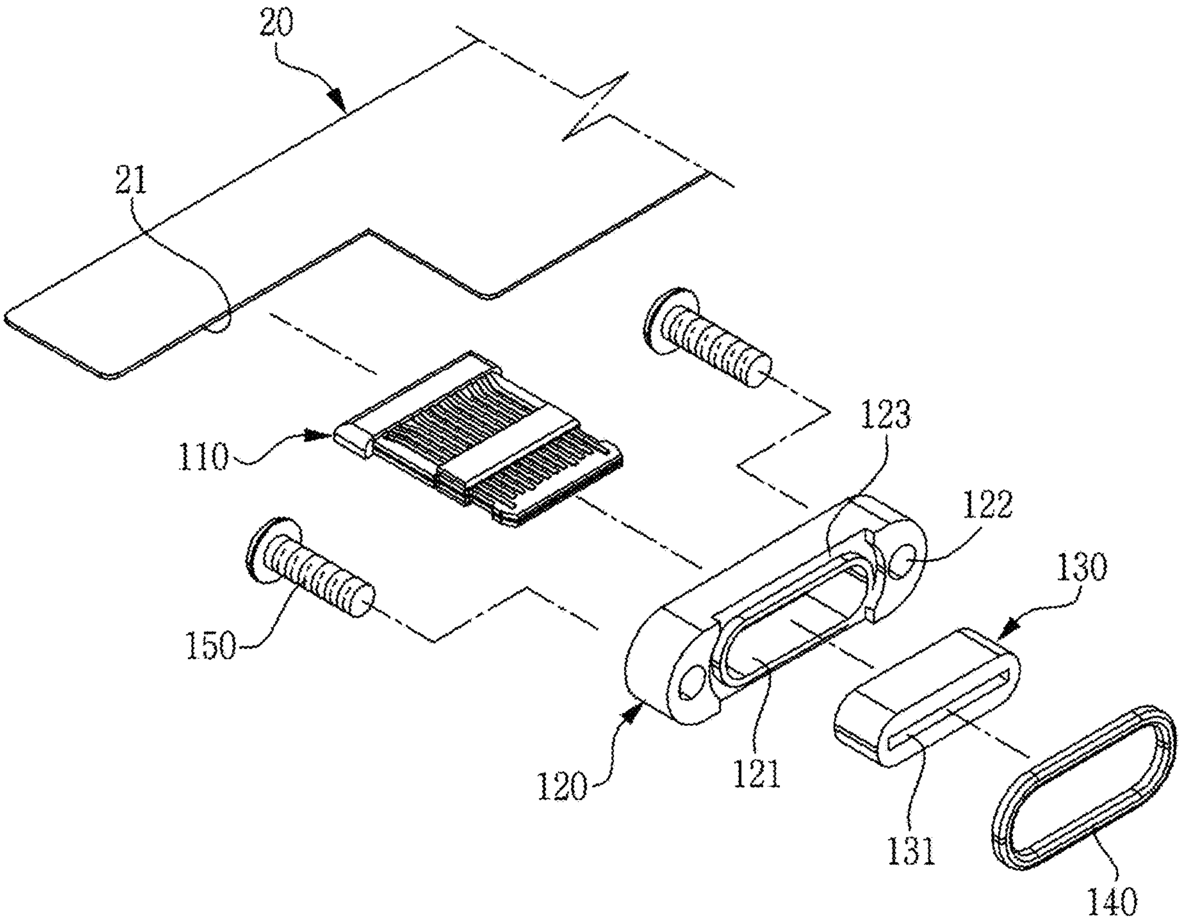
FIG. 4 is an exploded perspective view illustrating the metal shell-less receptacle connector according to the present disclosure, exploded in a horizontal direction.

In addition, FIG. 3 is an exploded perspective view illustrating the metal shell-less receptacle connector 100 according to the present disclosure, exploded in a vertical direction, and FIG. 4 is an exploded perspective view illustrating the metal shell-less receptacle connector 100 according to the present disclosure, exploded in a horizontal direction.

Figure 5:
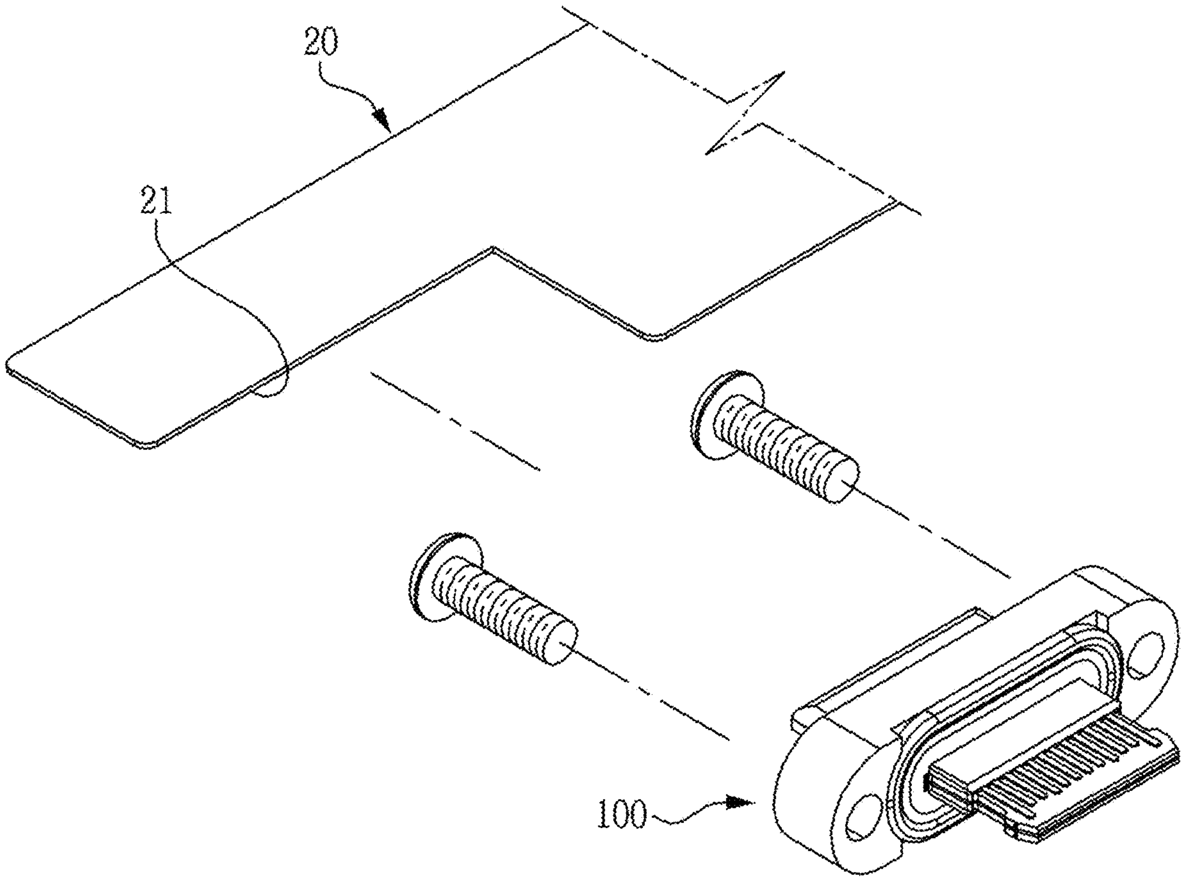
FIG. 5 is an assembled perspective view illustrating the metal shell-less receptacle connector according to the present disclosure.
Figure 6:
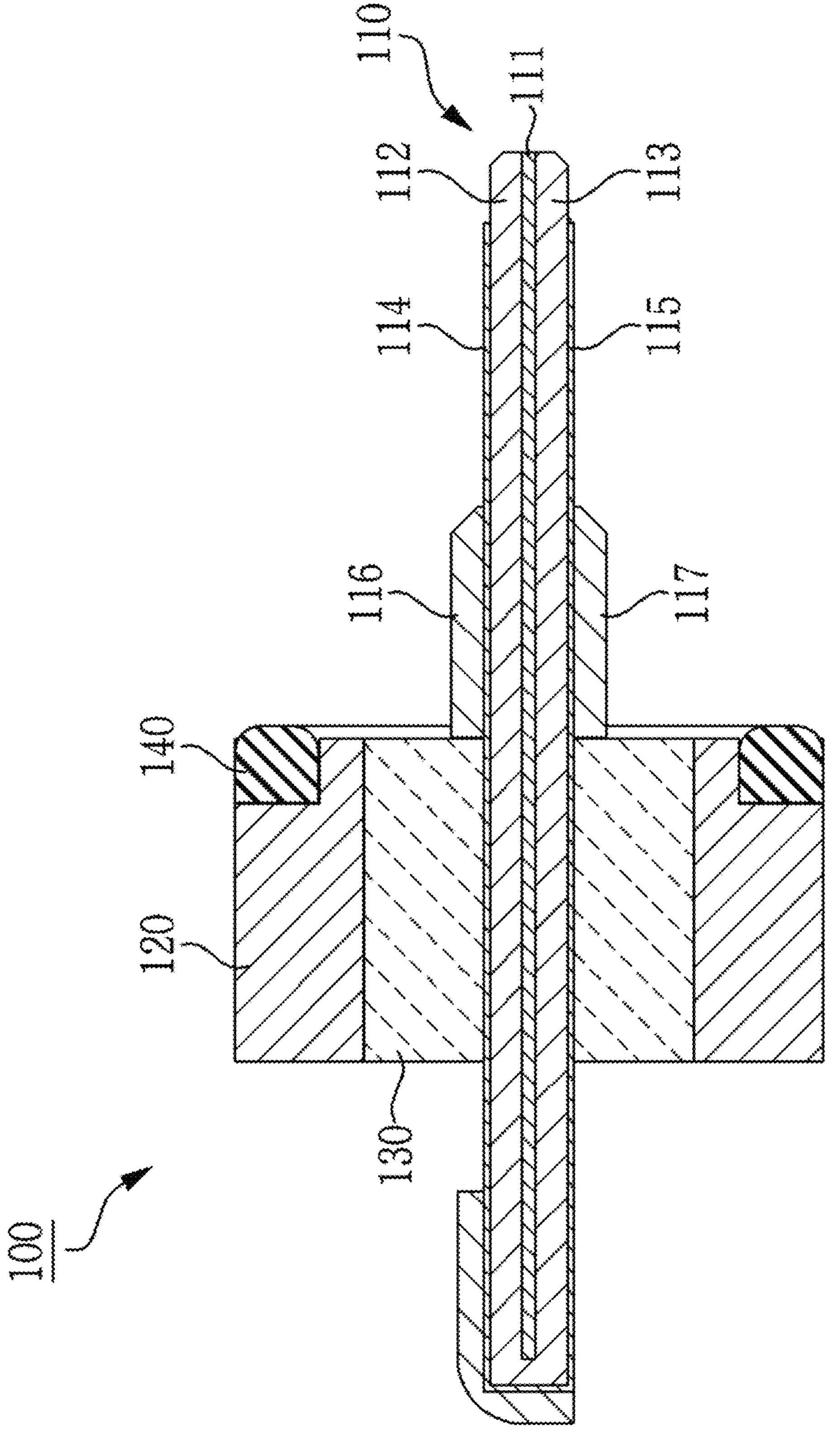
FIG. 6 is an assembled cross-sectional view illustrating the metal shell-less receptacle connector according to the present disclosure.

FIG. 5 is an assembled perspective view illustrating the metal shell-less receptacle connector 100 according to the present disclosure, and FIG. 6 is an assembled cross-sectional view illustrating the metal shell-less receptacle connector 100 according to the present disclosure. The metal shell-less receptacle connector is assembled as illustrated in FIGS. 5 and 6 by coupling the ceramic module 110 through the insertion hole 131 of the glass seal 130, fitting the glass seal 130 through the seal fastening hole 121 of the ceramic support 120, and fitting the O-ring 140 to the O-ring seating portion 123.

Figure 7:
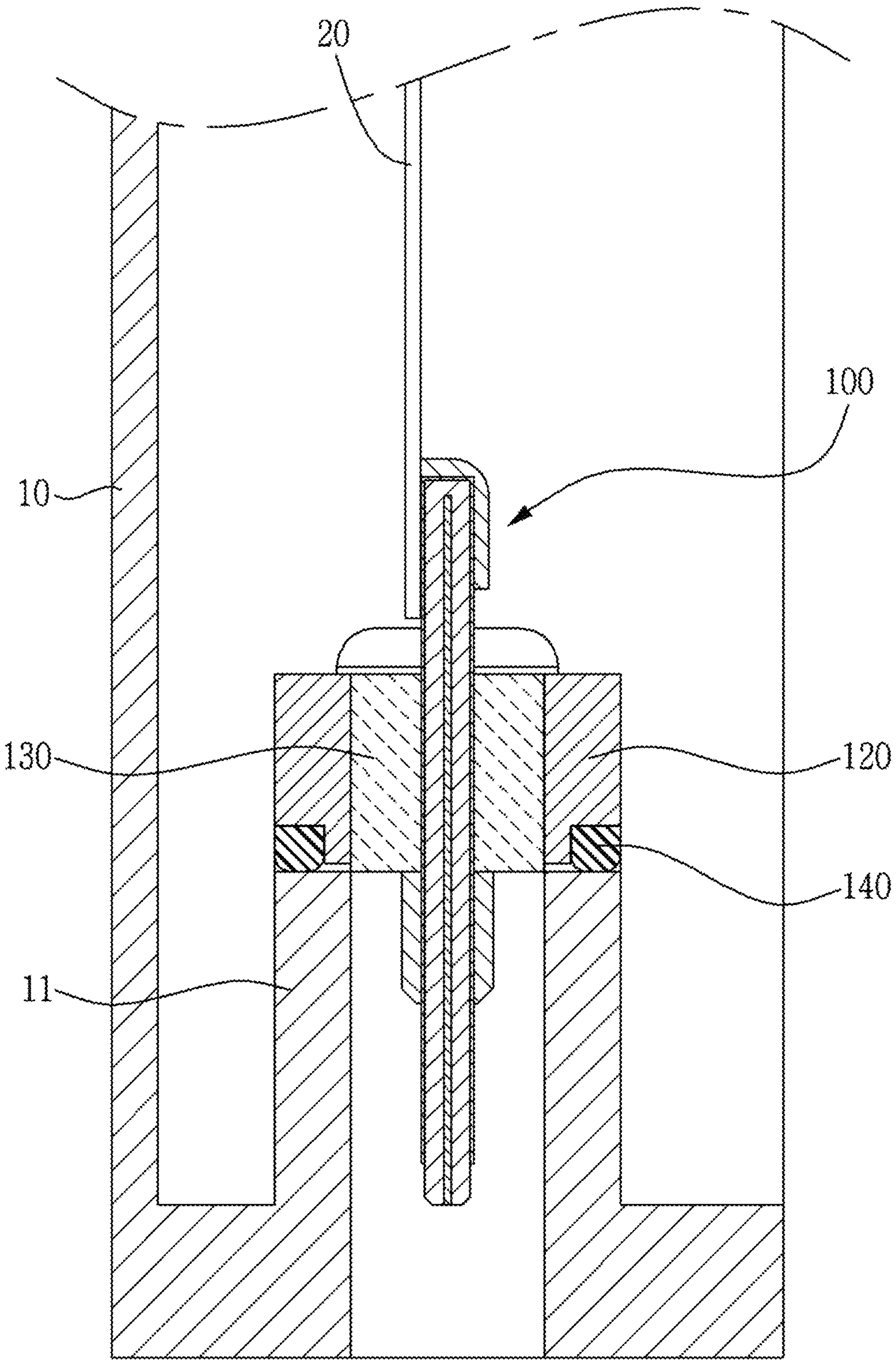
FIG. 7 is a cross-sectional view illustrating the utilization of the metal shell-less receptacle connector according to the first embodiment of the present disclosure.

FIG. 7 is a cross-sectional view illustrating the utilization of the metal shell-less receptacle connector 100 according to the first embodiment of the present disclosure. The receptacle connector 100 is connected to the main board by being mounted on the FPCB 20 and fixed using the underfill 110*a*/210*a*. The FPCB 20 has the cut portion 21 on a portion thereof for mounting the receptacle connector 100 on the main board. The receptacle connector 100 is fitted to the connector connecting part 11 of the frame 10. The connector connecting part 11 has the through-hole 12 in the central portion and the fastening holes 13 on both sides of the through-hole 12. The through-hole 12 allows the ceramic module 110 to be inserted thereinto, and the fasteners 150 are fastened to the fastening holes 13.

In addition, the second embodiment according to the present disclosure is as follows.

Figure 8:
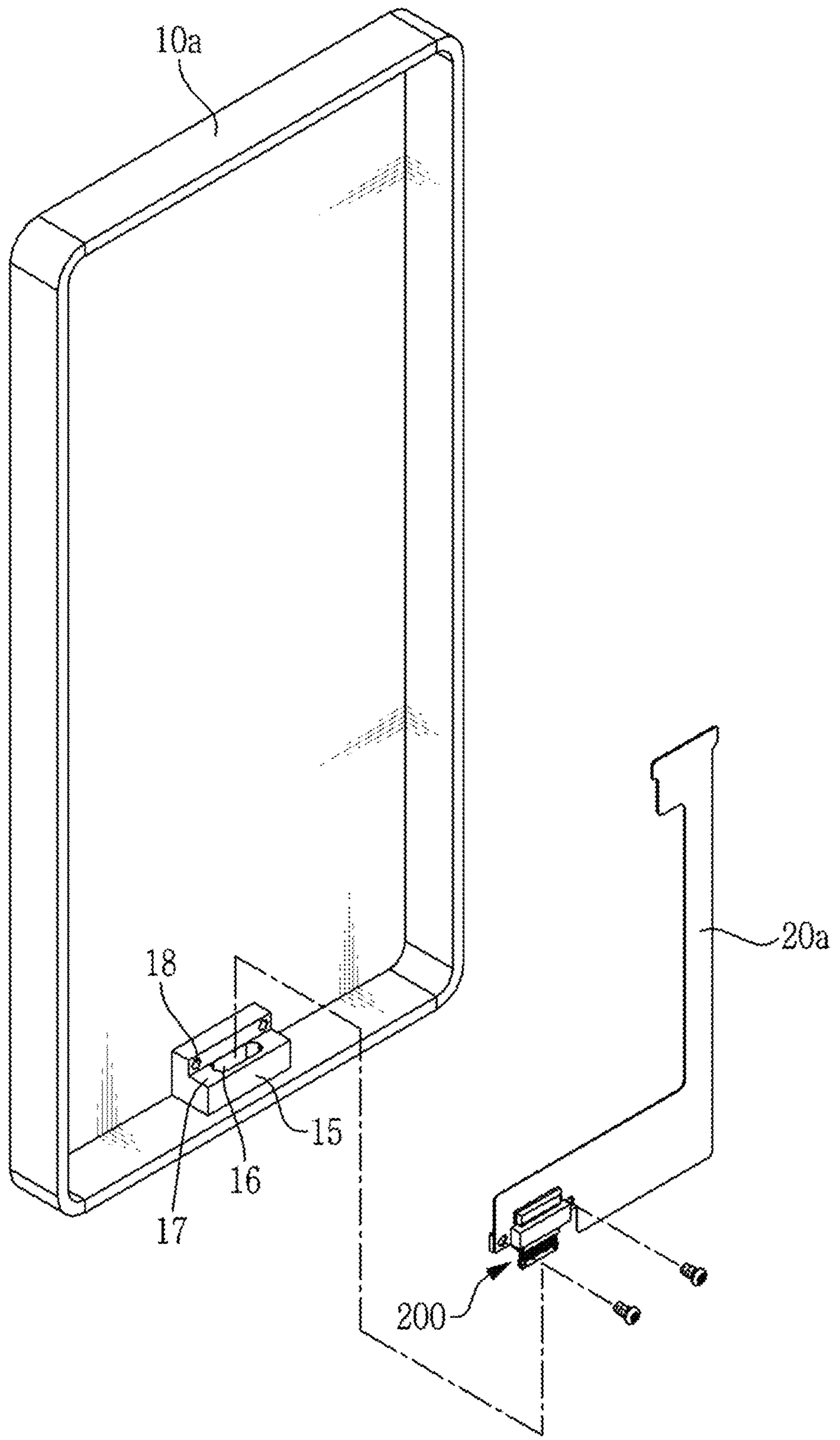
FIG. 8 is an exploded perspective view illustrating the utilization of a metal shell-less receptacle connector according to a second embodiment of the present disclosure.
Figure 9:
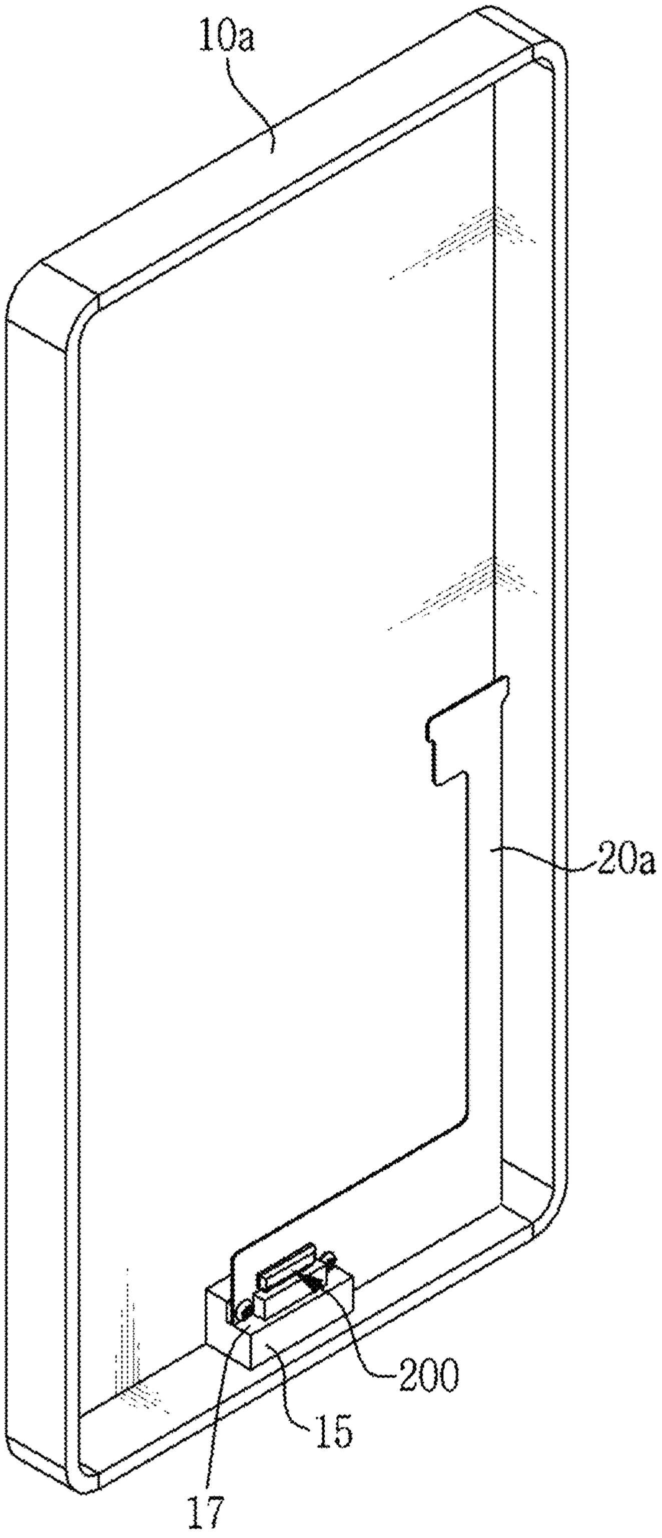
FIG. 9 is an assembled perspective view illustrating the utilization of the metal shell-less receptacle connector according to the second embodiment of the present disclosure.

FIG. 8 is an exploded perspective view illustrating the utilization of the metal shell-less receptacle connector 200 according to the second embodiment of the present disclosure, and FIG. 9 is an assembled perspective view illustrating the utilization of the metal shell-less receptacle connector 200 according to the second embodiment of the present disclosure. The receptacle connector 200 is mounted on the connector connecting part 15 of the frame 10*a* using the FPCB 20*a*.

Figure 10:
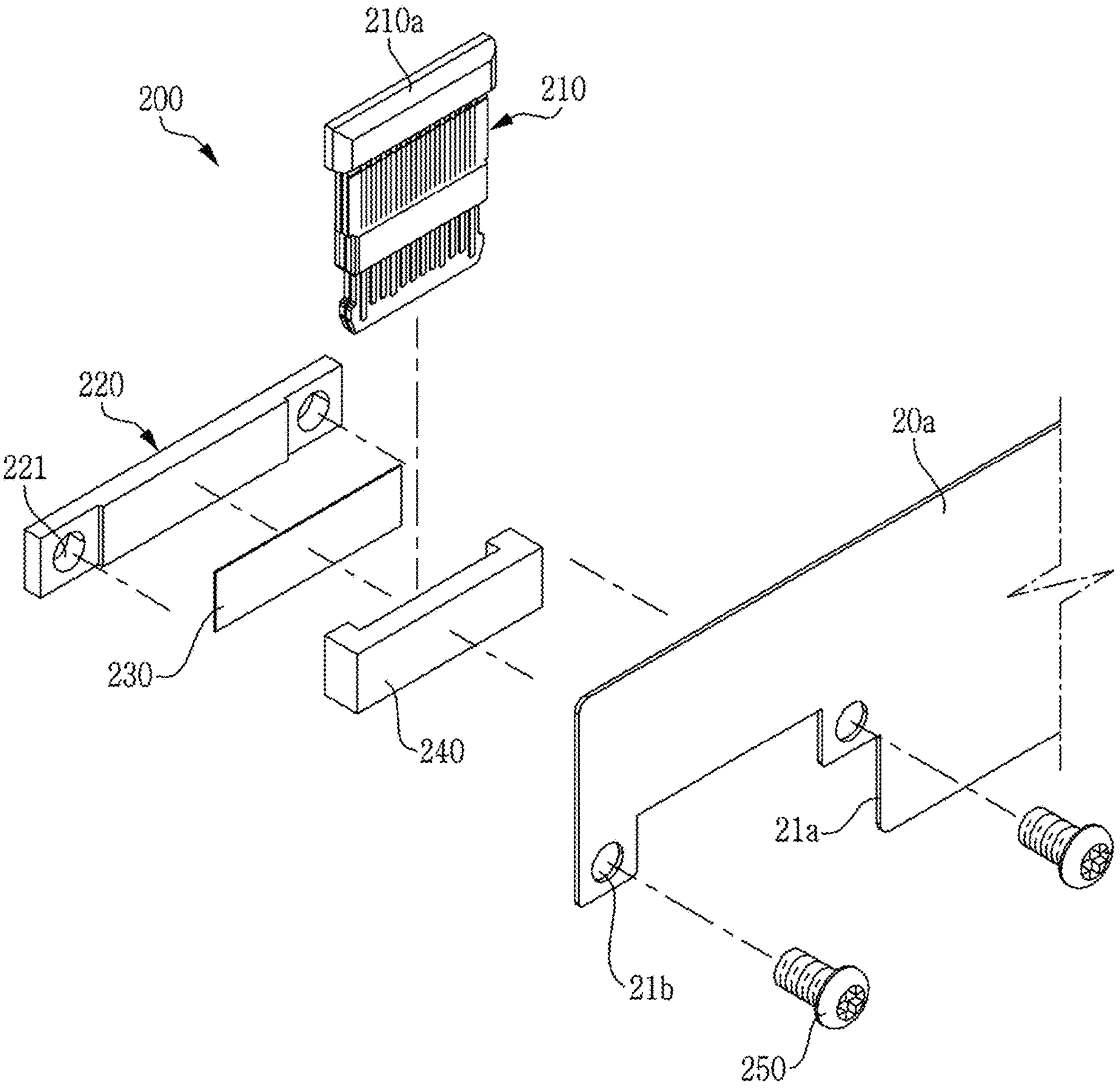
FIG. 10 is an exploded perspective view illustrating the metal shell-less receptacle connector according to the present disclosure, exploded in a horizontal direction.
Figure 11:
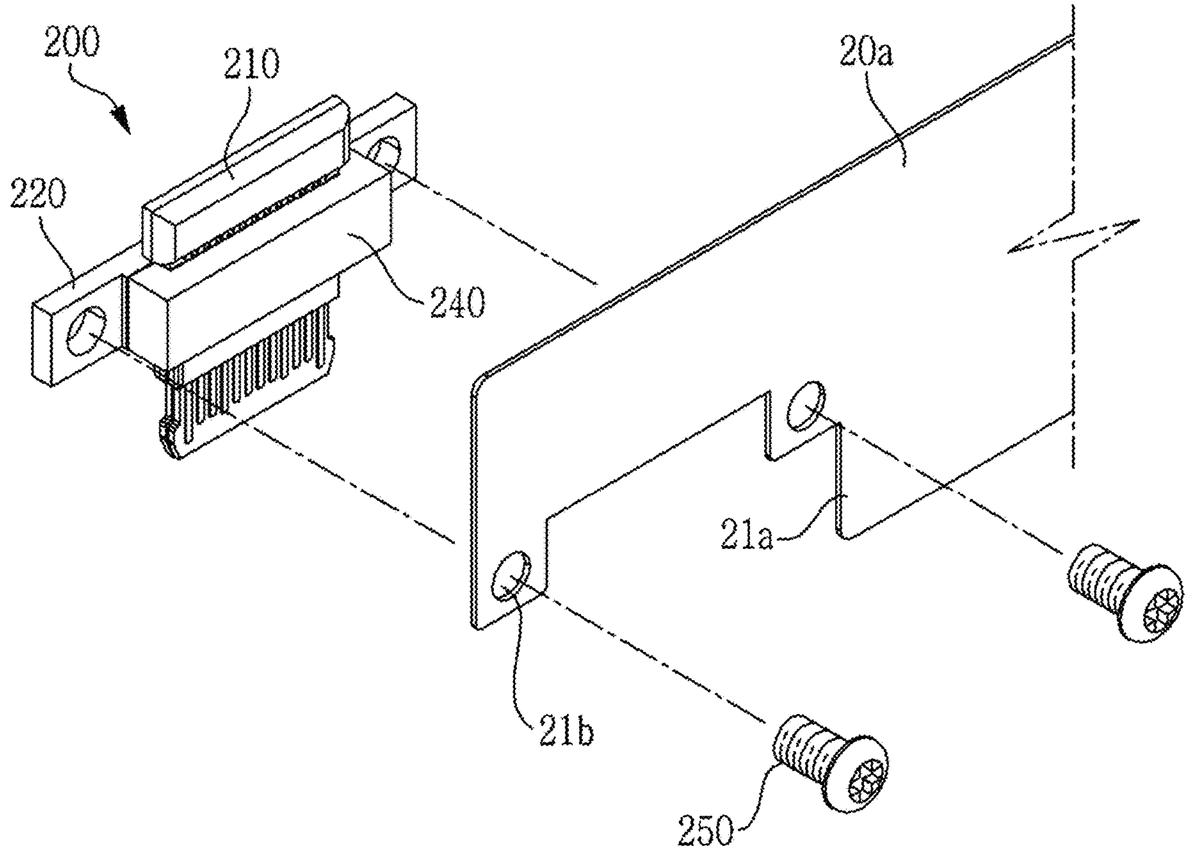
FIG. 11 is an assembled perspective view illustrating the metal shell-less receptacle connector according to the present disclosure.
Figure 12:
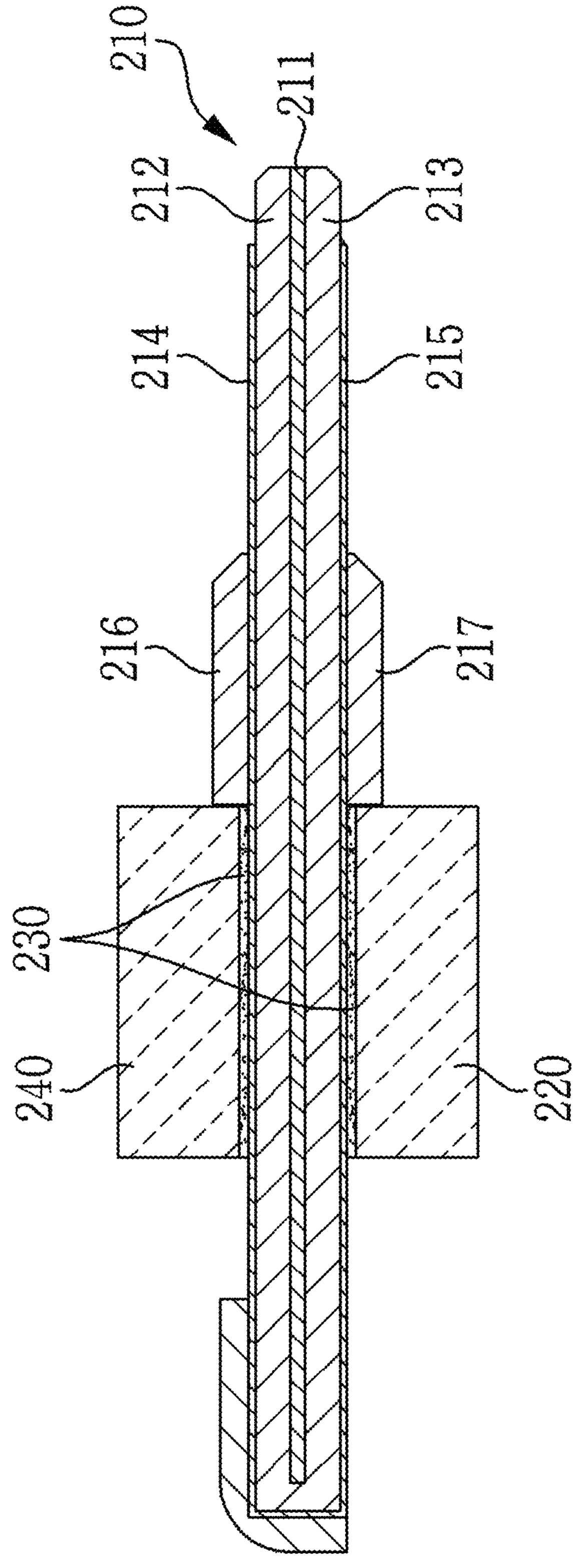
FIG. 12 is an assembled cross-sectional view illustrating the metal shell-less receptacle connector according to the present disclosure.
Figure 13:
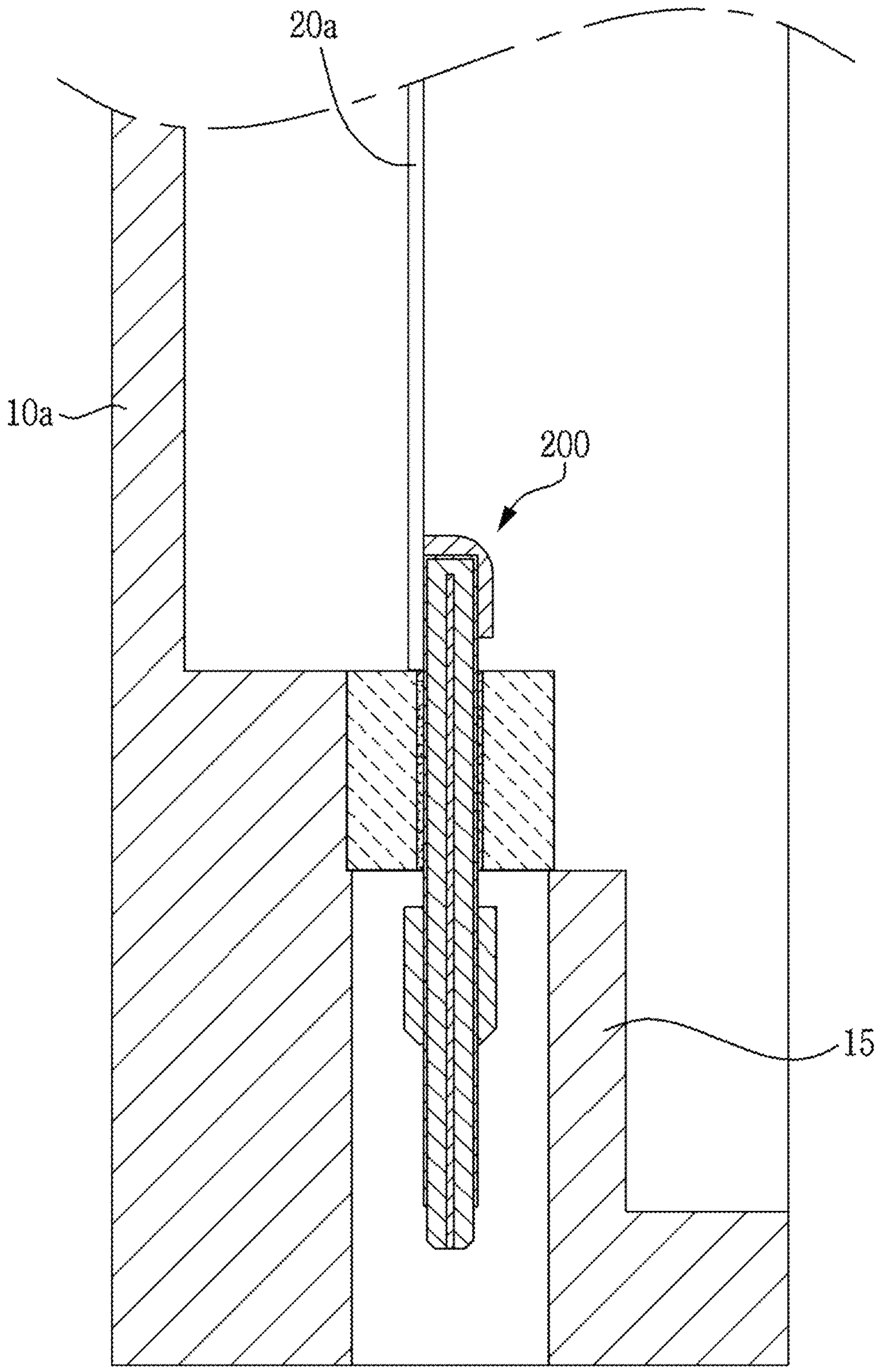
FIG. 13 is a cross-sectional view illustrating the utilization of the metal shell-less receptacle connector according to the first embodiment of the present disclosure.

FIG. 10 is an exploded perspective view illustrating the metal shell-less receptacle connector 200 according to the present disclosure, exploded in a horizontal direction, FIG. 11 is an assembled perspective view illustrating the metal shell-less receptacle connector 200 according to the present disclosure; FIG. 12 is an assembled cross-sectional view illustrating the metal shell-less receptacle connector 200 according to the present disclosure, and FIG. 13 is a cross-sectional view illustrating the utilization of the metal shell-less receptacle connector 200 according to the first embodiment of the present disclosure. The receptacle connector 200 is connected to the main board by being mounted on the FPCB 20*a* and then fixed using the underfill. The FPCB 20*a* has the cut portion 21*a* on a portion thereof for mounting the receptacle connector 200 on the main board and holes 21*b* to which the fasteners 250 are fastened. In addition, the receptacle connector 200 is fitted to the connector connecting part 15 of the frame 10*a*. The connector connecting part 15 has the seating portion 17 on which the receptacle connector 200 is seated. The connector connecting part 15 has the through-hole 16 in the central portion and the fastening holes 13 on both sides of the through-hole 16. The through-hole 16 allows the ceramic module 210 to be inserted thereinto, and the fasteners 250 are fastened to the fastening holes 13.

The operation and effects of the above-described metal shell-less receptacle connector according to the present disclosure will be described in more detail as follows.

The upper and lower ceramic insulators 112/212 and 113/213 according to the present disclosure are fabricated by tape-casting ceramic powder, followed by punching or dry pressing. In addition, since the upper and lower ceramic insulators 112/212 and 113/213 have a low dielectric loss, the data transmission rate of the metal shell-less receptacle connector is improved. In addition, the high thermal conductivity of the upper and lower ceramic insulators 112/212 and 113/213 may improve heat dissipation performance, thereby improving the charging efficiency of the metal shell-less receptacle connector. In addition, high strength and friction resistance may improve the durability of the metal shell-less receptacle connector.

In addition, the upper and lower metal contacts 114/214 and 115/215 according to the present disclosure are formed by one selected from printing, deposition, filling, peeling, direct copper plating, and direct copper bonding. In addition, the upper and lower metal contacts 114/214 and 115/215 are in close contact with the upper and lower ceramic insulators 112/212 and 113/213, thereby improving corrosion resistance over that of conventional plastic connectors. In addition, since the line width has a high degree of freedom, impedance may be optimized, thereby improving high-speed data transmission.

Furthermore, the intermediate metal layer 111 or 211 and the upper and lower ceramic plates 116/216 and 117/217 may be formed by a bonding method, with heat resistance thereof being improved by glass bonding.

In addition, the upper and lower ceramic insulators, the upper and lower metal contacts, the intermediate metal layer, and the upper and lower ceramic plates may be formed of one selected from HTCC, LTCC, LTCC-M.

Furthermore, the ceramic support 120 and the upper and lower ceramic supports 240 and 220 may be fabricated by ceramic injection molding or drying pressing to have improved durability due to high strength and improved charging efficiency due to high thermal conductivity.

In addition, the glass seal 130/230 may improve waterproof performance by providing a seal to the ceramic module 110/210 and the ceramic supports using glass. Due to simplified assembly, mass production ability may be improved.

Furthermore, the O-ring 140 may be in close contact with the frame 10 of the mobile device, thereby improving waterproof performance.

In addition, the upper and lower ceramic supports 240 and 220 according to the second embodiment of the present disclosure may be fabricated by ceramic injection molding or drying pressing to have improved durability due to high strength and improved charging efficiency due to high thermal conductivity.

Furthermore, the glass bonding material 230 serves to bond the upper and lower ceramic supports, the ceramic module, and the lower ceramic support, may improve charging efficiency due to high thermal conductivity.

In addition, the present disclosure 의 receptacle connector 100/200 may be bonded on top of the FPCB 20/20*a* to form a single module. This may simplify an assembly process of fitting the main board and the connector together and improve the degree of freedom of design of the main board.

Furthermore, according to the present disclosure, the receptacle connector 100/200 is soldered to the FPCB 20/20*a*, and the strength of a joining portion is improved using the underfill 110*a*/210*a*.

In addition, according to the present disclosure, the connector is fastened to the frame 10/10*a* of the mobile device using a screw.

In particular, the receptacle connector 100/200 according to the present disclosure is configured such that a metal shell of a receptacle connector of the related art is removed and a shell is formed in the frame of the mobile device. Due to this configuration, there may be no changes in the resonance frequency of an antenna positioned adjacent to the connector and only a small amount of gain may be reduced, thereby reducing the performance of the antenna.

According to the present disclosure as described above, test results as illustrated in Table 1 below were obtained.

TABLE 1

| Item | Plastic (LCP Glass 40%) | Ceramic (Alumina, Al203) | Ceramic Vs. Plastic |
|---|---|---|---|
| Dielectric Loss Angle | 0.006 | 0.0004 | Over 15 times |
| Thermal Conductivity | 0.3 W/m-K | 24 W/m-K | Over 80 times |
| Compressive Strength | 100 MPa | 2200 MPa | Over 20 times |

According to the present disclosure as in the above illustrated results, it was appreciated that heat dissipation was effective when the insulators had high thermal conductivity, since heat was transmitted to the contacts, the insulators, and outer shells. A dielectric loss angle was 15 times or more, compression strength was 20 times or more, and thermal conductivity performance of ceramic was 80 times that of the plastic material of the related art. Accordingly, heat dissipation performance was improved.

Figure 14A:
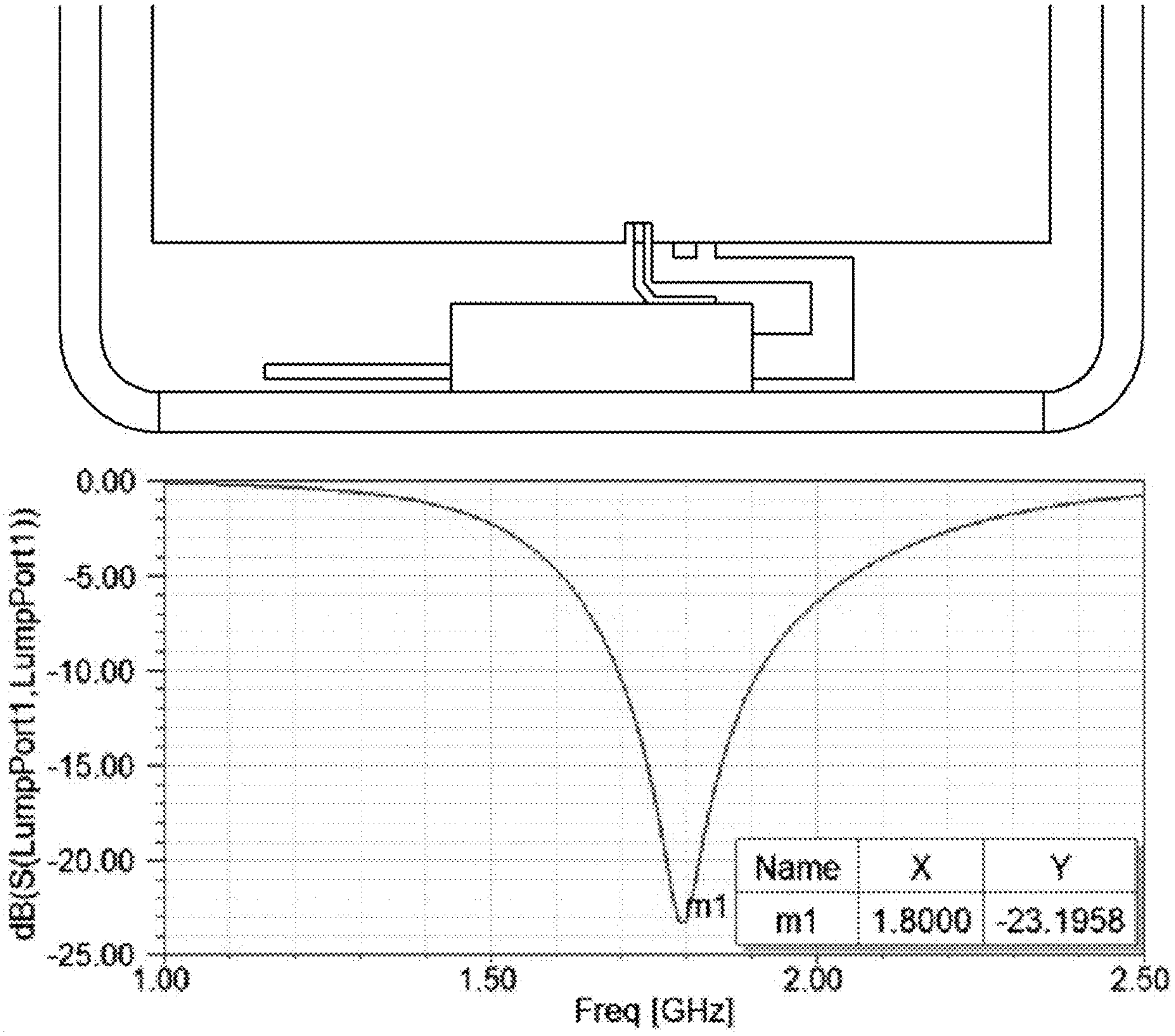
FIG. 14A illustrates the simulation results without a connector.
Figure 14B:
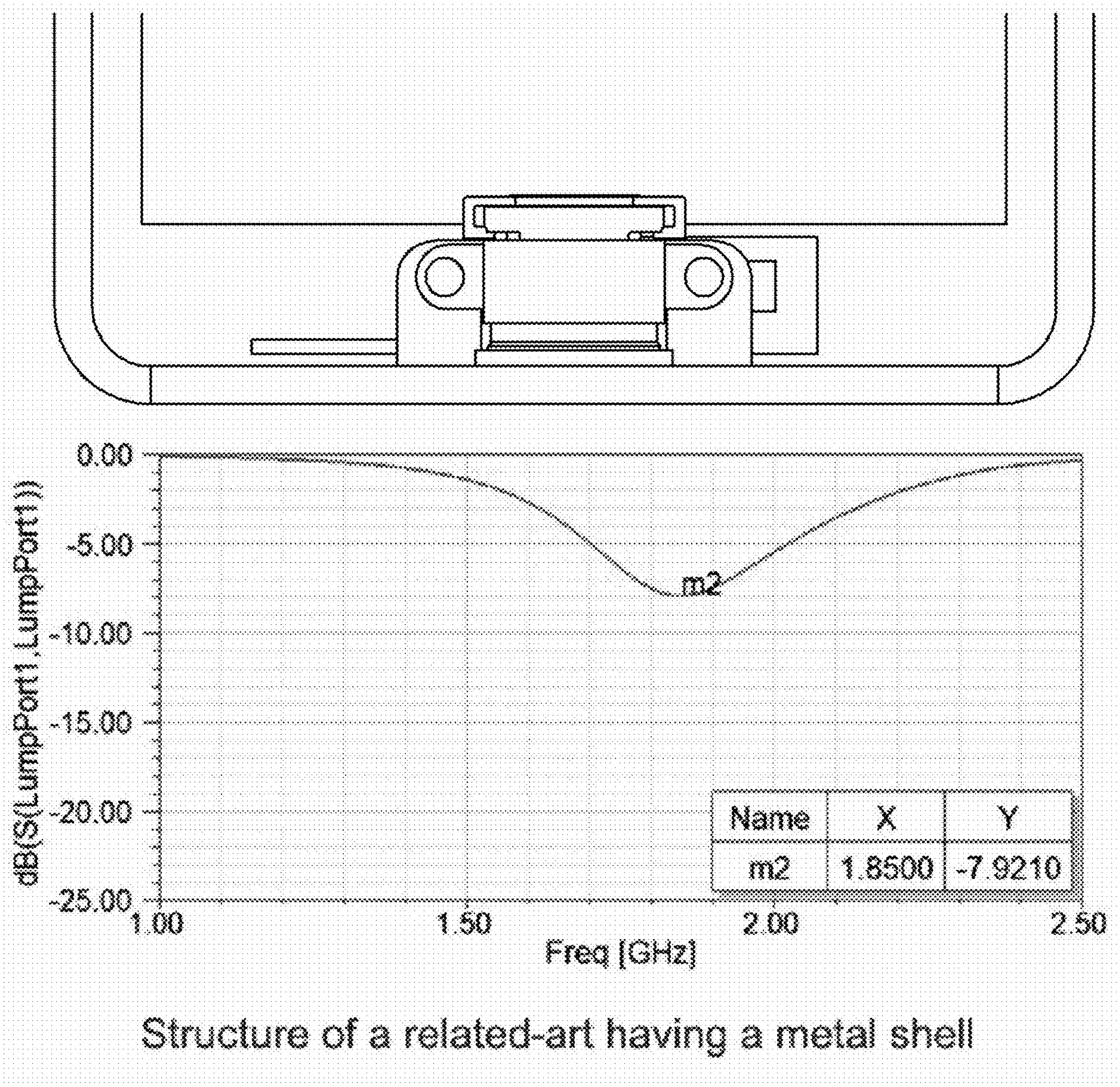
FIG. 14B illustrates the simulation results with a structure of a metal shell.
Figure 14C:
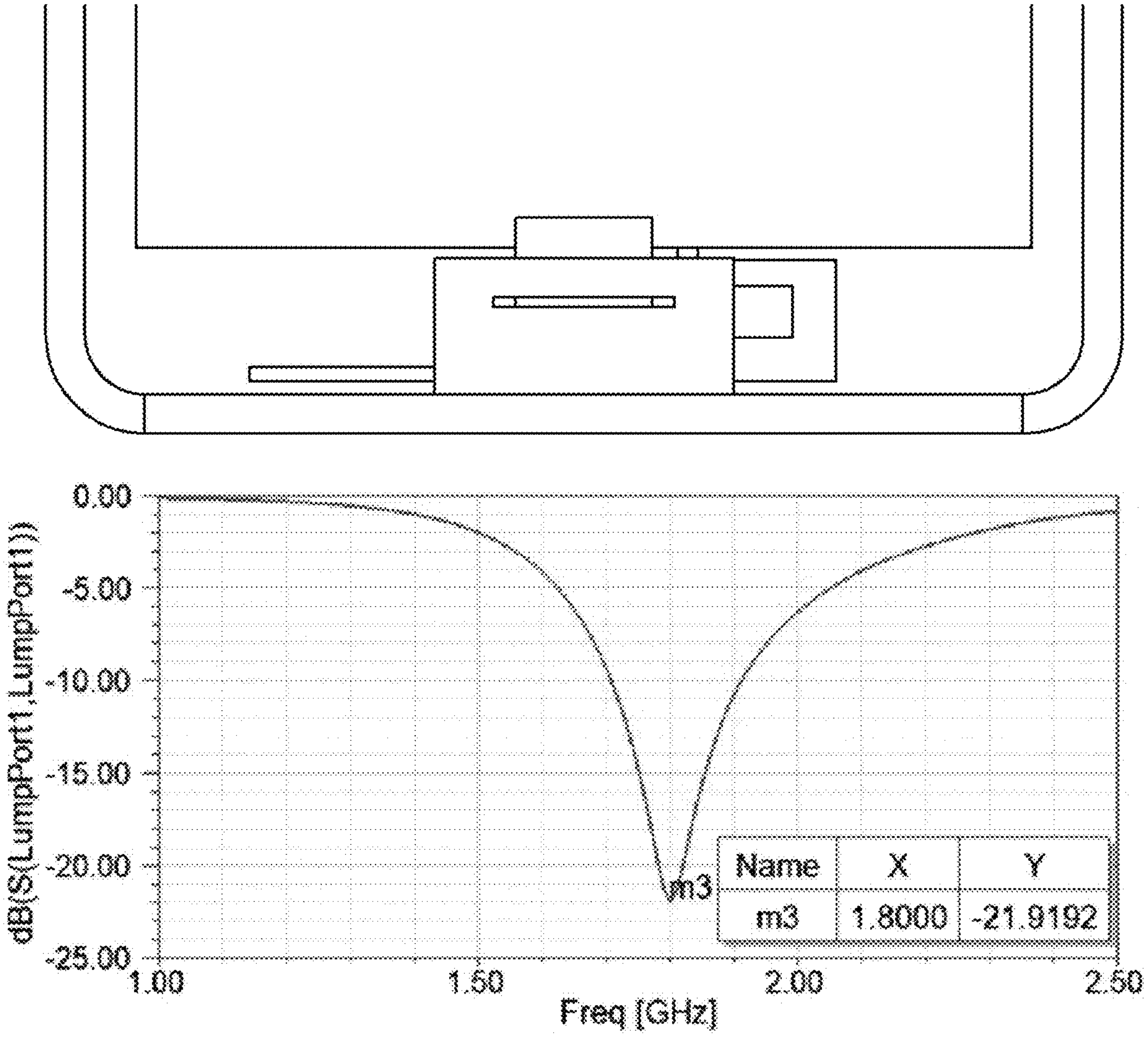
FIG. 14C illustrates the simulation results with a shell-less structure.

Furthermore, the present disclosure obtained test results as illustrated in FIGS. 14A to 14C.

The test results from FIGS. 14A-14C are results obtained by simulating antenna patterns occurring on back covers of mobile phones.

In the results of the simulation compared in FIG. 14A indicates a structure without a connector, 14B indicates a structure of a related-art having a metal shell, and 14C indicates a shell-less structure according to the present disclosure.

In 14A, the resonance frequency was 1.8 GHz, and the total gain was 2.14. In B, the resonance frequency was 1.85 GHz, and the total gain was 1.81. In C, the resonance frequency was 1.8 GHz, and the total gain was 2.11.

According to the results of the simulation, it was appreciated that, in the metal shell-less structure 14C according to the present disclosure, frequency interference was reduced so as to have no change in the resonance frequency of the antenna positioned adjacent to the connector and a small amount of gain was reduced. Thus, the metal shell-less structure 14C according to the present disclosure was able to improve the performance of the antenna.

As set forth above, according to the present disclosure, the connector having the above-described technical configuration may be formed using ceramic having lower dielectric loss and higher heat resistance performance than a related-art connector formed using plastic, and thus may be mass produced at low cost due to a simplified process. High-speed data transmission is possible due to low loss characteristics of the ceramic material. The metal contacts are formed on the ceramic insulator by direct copper plating or direct copper bonding. Due to high degree of freedom of a line width, impedance may be optimized, thereby enabling high-speed data transmission. Heat dissipation is effective when the insulators have high thermal conductivity, since heat is transmitted to the contacts, the insulators, and outer shells. Thermal conductivity performance of ceramic is 80 times than that of a plastic material of the related art. Accordingly, heat dissipation performance was improved. Due to high strength and friction resistance characteristics of the ceramic material, durability may be improved. The structure in which the metal contacts are precisely provided on the ceramic material may reduce surface mounter technology (SMT) defects due to high position precision. The shell-less structure may reduce frequency interference to have no change in resonance frequency of an antenna positioned adjacent to the connector and have only a small amount of reduction in gain, thereby reducing the performance of the antenna.

The technical ideal of the metal shell-less receptacle connector according to the present disclosure may repeatedly achieve the same results. In particular, by carrying out the present disclosure as described above, technological development may be promoted so as to contribute to industrial development. Therefore, the present disclosure is worth of protection.

What is claimed is:

1. A metal shell-less receptacle connector comprising:

a ceramic module;

a glass seal having an insertion hole into which an outer circumferential portion of the ceramic module is fitted; and a ceramic support having a seal fastening hole into which an outer circumferential portion of the glass seal is fitted and fastening holes to which fasteners are fastened, wherein the ceramic support has an O-ring seating portion, to which an O-ring is fitted to provide airtightness, wherein the receptacle connector is connected to a main board by being mounted on a flexible printed circuit board and fixed using an underfill, the flexible printed circuit board having a cut portion on a portion thereof for mounting of the receptacle connector on the main board, wherein the receptacle connector is connected to a connector connecting part of a frame, the connector connecting part having a through-hole, into which the ceramic module is inserted, in a central portion thereof and fastening holes on both sides of the through-hole, to which the fasteners are fastened, and wherein the receptacle connector is connected to the main board by connecting the receptacle connector to an outer circumferential portion of the flexible printed circuit board by soldering and fixing the receptacle connector using the underfill.

2. The metal shell-less receptacle connector of claim 1, wherein the ceramic module comprises:

an intermediate metal layer;

an upper ceramic insulator and a lower ceramic insulator provided on outer circumferential portions of the intermediate metal layer;

an upper metal contact and a lower metal contact provided on a top surface of the upper ceramic insulator and a bottom surface of the lower ceramic insulator, respectively; and an upper ceramic plate and a lower ceramic plate provided on a top surface of the upper metal contact and a bottom surface of the lower metal contact, respectively.

3. The metal shell-less receptacle connector of claim 2, wherein the ceramic module is configured such that the upper and lower metal contacts are provided on outer circumferential portions of the upper and lower ceramic insulators by one selected from printing, deposition, filling, peeling, direct copper plating, and direct copper bonding.

4. The metal shell-less receptacle connector of claim 2, wherein:

the upper ceramic plate is composed of one of high temperature co-fired ceramic, low temperature co-fired ceramic, or low temperature co-fired ceramic on metal, and the lower ceramic plate is composed of one of the high temperature co-fired ceramic, the low temperature co-fired ceramic, or the low temperature co-fired ceramic on metal.

* * * * *